Dec. 31, 1929.  F. JARDINE  1,741,843
PISTON
Filed July 31, 1925
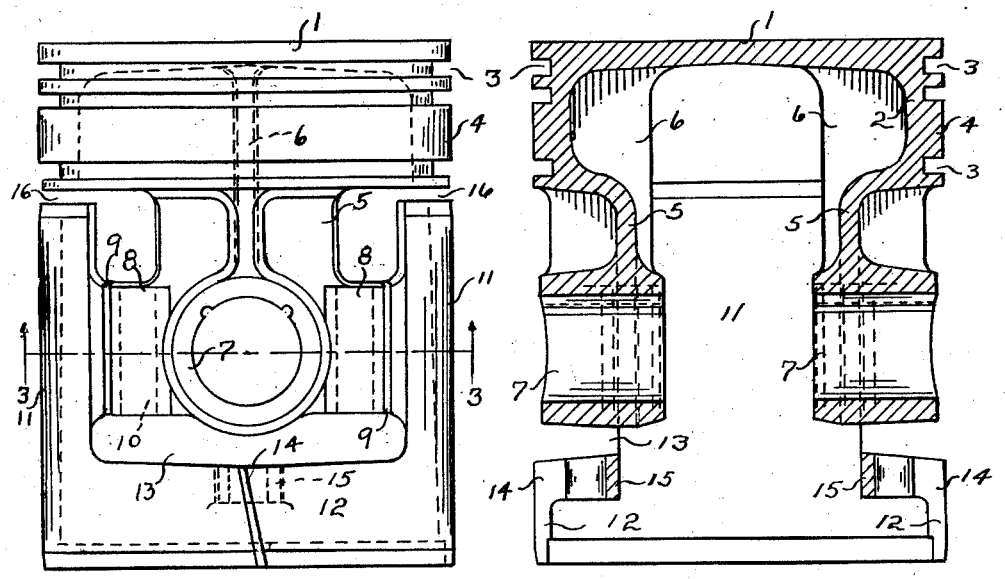
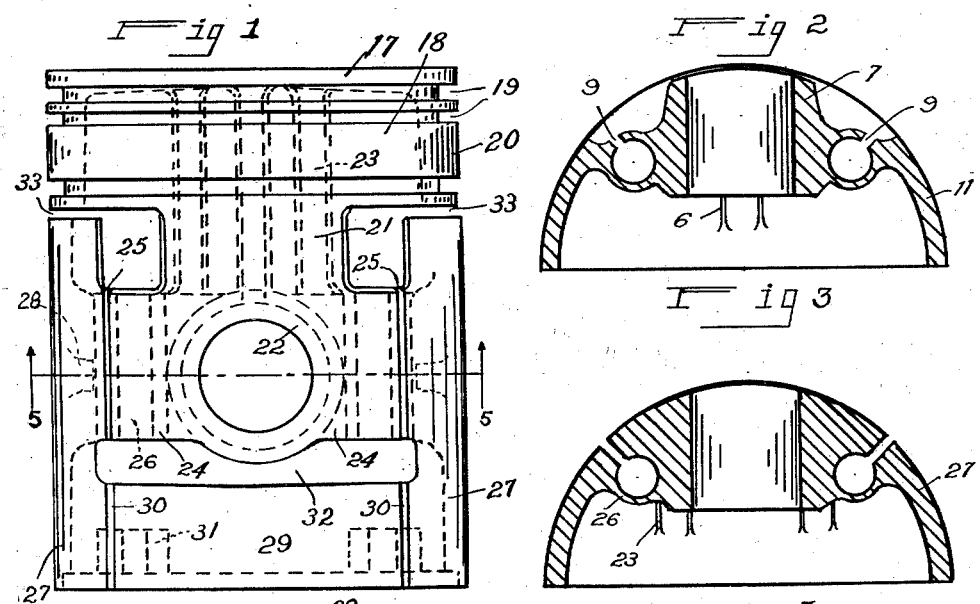
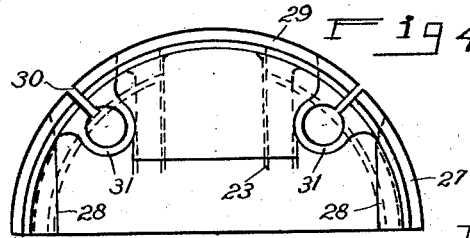
INVENTOR
Frank Jardine
BY
Richey Slough Watts
ATTORNEYS Patented Dec. 31, 1929

1,741,843

UNITED STATES PATENT OFFICE

FRANK JARDINE, OF CLEVELAND, OHIO, ASSIGNOR, BY MESNE ASSIGNMENTS, TO THE CLEVELAND TRUST COMPANY, AS TRUSTEE, OF CLEVELAND, OHIO, A CORPORATION OF OHIO

PISTON

Application filed July 31, 1925. Serial No. 47,234.

This invention relates to pistons for internal combustion engines.

One object of the invention is to construct a piston having bearing walls so supported as to compensate automatically for the changes in dimensions thereof under varying temperature changes, thereby maintaining ample operating clearance between the piston and its cylinder at all times.

Another object is to construct a piston having bearing wall carrying webs which are resiliently yieldable under abnormal forces transmitted thereto by either the piston head or bearing walls.

A further object is to construct a piston having substantially rigid, oppositely disposed, flexibly supported bearing walls flexibly connected to each other.

Other objects will appear and be pointed out hereinafter.

In the drawings attached to and forming a part of this specification:

Figure 1 is a side elevation of a piston constructed in accordance with my invention;

Figure 2 is a sectional view taken on line 2—2 of Fig. 1;

Figure 3 is a sectional view taken on line 3—3 of Fig. 1;

Figure 4 is a view similar to Fig. 1 but showing a modified piston embodying my invention;

Figure 5 is a sectional view taken on line 5—5 of Fig. 4; and

Figure 6 is an open end view of the piston of Fig. 4.

Referring first to Figs. 1, 2 and 3 wherein is shown a piston for an internal combustion engine, the head of the piston consists of an end wall or disc 1 having a peripheral depending flange 2, in the outer side of which is formed grooves 3 for receiving piston rings (not shown). This flange 2 has a relatively wide circumferentially extending surface 4 which serves as a bearing surface when the piston is at operating temperatures in its cylinder. This surface 4 may be disposed at various places on the flange 2 but preferably it is located below one or more ring grooves 3 and some distance above the upper end of the skirt. The purpose of the bearing surface will appear presently hereinafter.

From the flange 2 oppositely disposed webs 5 extend downwardly and inwardly of the piston and are rigidly connected to the flange 2 and, if desired, also to the disc 1 of the head as by ribs 6. Each web 5 carries a wrist pin boss 7 near its lower end, the bosses being aligned to receive a wrist pin (not shown). Extending laterally from either side of the webs 5 and preferably adjacent to the bosses are cross webs 8. These webs are each made flexible as by providing them with splits 9 extending thereacross and substantially parallel to their outer ends or vertical edges, and with curved, flexible walls 10 formed integrally therewith and spanning the splits. The flexible walls 10 are preferably arcuate or culvert-shaped as shown, having their inner and outer surfaces cylindrical and concentric with each other throughout as long an arc as possible, preferably for over 180°. By being so formed the walls are not only flexible but tend to partially close the splits 9 upon expansion of the metal. The skirt of the piston consists of two oppositely disposed, substantially rigid walls 11 constituting bearing walls to receive the side thrust due to the angularity of the connecting rod when operating in an engine, these walls having at their lower ends flexible curved walls 12. These walls 12 extend from the open end of the skirt nearly to the bosses but are spaced apart from the bosses 7 and the cross walls 8 by air gaps 13. Each of these curved walls 12 has one or more splits 14 therein extending from side to side thereof, or from the open end of the skirt to the air gaps 13 and a resilient wall 15 spanning each of the splits 14 and integrally connected with the walls 12 on either side thereof. As shown in Figs. 1, 2 and 3, the splits 14 are disposed in substantial alignment with the bosses but it will be understood that they may be positioned at other points in the curved walls 12.

The skirt is disconnected or spaced apart from the head of the piston by circumferentially extending splits 16 and is connected to the head preferably through the medium only of the cross webs 8 and depending webs 5.

When a piston of the foregoing construction is operated in an engine cylinder, the cross walls 8 are capable of flexing resiliently under the forces of expansion of either the head or the skirt against the cylinder walls.

When a piston of the foregoing construction is operated in an engine cylinder the flexible walls 10 and 15 permit considerable relative movement of the piston parts. As the head expands the boss carrying walls 5 may move radially outward without harmfully distorting the bearing walls 11. The bearing walls 11 may move radially inward under thrust forces independently of the position of walls 5. The size, shape and radial positioning of the walls 10 and 15 determine the extent and nature of these relative movements of the piston parts. Preferably the walls 10 and 15 are relatively short as compared with walls 11 and 12, respectively, to permit independent relative movement of the walls 5 and 11 as desired.

Referring now to Figs. 4, 5 and 6, wherein is shown a modified form of piston, the head of the piston consists of an end wall or disc 17 having a depending peripheral flange 18 in the outer surface of which is formed a plurality of ring grooves 19 for piston rings (not shown) and a circumferentially extending, relatively wide bearing surface 20 disposed at some distance from the end wall 17 of the head. Oppositely disposed webs 21 each carrying a wrist pin boss 22 depend from the flange 18 and may carry ribs 23 which are formed integrally with the flange, disc and bosses. From either side of each boss 22, curved walls 24 extend laterally, and preferably from adjacent the outer end of the bosses and unite with a skirt at their outer or vertical ends. Intermediate the ends of these cross webs 24 splits 25 are formed extending thereacross, which splits are spanned by resilient flexible walls 26 integrally united on either side of the splits with the cross webs. The skirt consists of oppositely disposed, substantially rigid bearing walls 27 and each may have a reinforced section 28, these walls being connected at their lower end by curved walls 29 through which one or more splits 30 are formed. Each split 30 is spanned by a resilient wall 31 integral with the walls on either side thereof. Between the upper edges of these curved walls and the lower edge of the bosses and cross webs 24, air gaps 32 are formed. Preferably the depending boss carrying webs 21 and 24 have outside diameters slightly smaller, say about .005" on either or both sides, than the diameter of the bearing walls 27 and of the curved walls 29. The bearing walls 27 of the skirt are separated from the head by splits or air gaps 33, and the depending webs 21 and flexible cross webs 24 preferably constitute the only connection between the skirt and the head.

In the device shown in these figures, the curved walls 29 are each provided with two splits 30 which are in substantial alignment with the splits 25 in the adjacent cross webs 24. Force applied to the cross webs by either the bearing walls 27 of the skirt or by the head tend to produce flexing of the resilient walls after the manner described above in connection with the piston shown in Figs. 1, 2 and 3, inclusive, without causing scoring of the piston.

In each of these modifications, the cross walls 24 have been shown as being relatively narrow but it will be understood that where greater rigidity or less flexibility of these cross walls is desired, the cross walls may be enlarged lengthwise as well as increased in thickness. Similarly, the resilient walls 31 formed in the curved walls 29 below the bosses may be varied in size to obtain the desired flexibility or rigidity thereof. The piston of Figs. 4 to 6 operate substantially like that of Figs. 1 to 3.

Pistons constructed according to either of the foregoing modifications, when operating in a cylinder under normal engine conditions, will have bearing contact with the cylinder wall not only in the skirt portion of the piston but also in the head. The relatively wide bearing 20 on the ring flange affords two spaced bearings, as contrasted with the one bearing normally present in an ordinary piston where the head is of such diameter that the walls thereof never have bearing engagement with the cylinder wall. This bearing surface on the head tends to prevent tilting of the piston in its cylinder and thereby minimizes the transverse movement of the piston in the cylinder. Moreover, the pistons, being machined with a substantially true cylindrical outer surface, have bearing engagement entirely therearound against the cylinder which ensures more or less cylindrical wear on the cylinder and tends to reduce the amount of lubricant which otherwise might pass into the combustion chamber. One function of the walls 15 and 31 is to support the walls 12 and 29 during machining so that their surfaces may be machined cylindrically. Without support the walls 12 and 29 would yield under machining forces and result in a finished structure, not truly cylindrical which would either not have bearing engagement with the cylinder at all points or else bear with greater force at some points than at others. These walls 15 and 31 thus facilitate accurate machining of the piston.

Pistons of the general structure herein shown and claimed but including means for controlling the skirt are claimed in other copending applications of mine, including Serial No. 47,214 filed July 31, 1925, Serial No. 47,213 now Patent No. 1,563,194, Serial No. 100,772 now Patent No. 1,730,120, Serial No. 100,773 now Patent No. 1,727,647 and Serial No. 100,774 filed April 9, 1926.

Having thus described my invention so that those skilled in the art may be enabled to practice the same, what I desire to secure by Letters Patent is defined in what is claimed, it being understood that various changes not amounting to invention may be made in the structure described in detail hereinabove without departing from the spirit of my invention.

What is claimed is:

1. An internal combustion engine piston comprising a head having a relatively wide, circumferentially extending surface constituting a bearing for the piston against the cylinder wall, a skirt spaced apart from the head and consisting of oppositely disposed bearing walls united at their lower ends by flexible curved walls, and flexible webs carrying the bearing walls and yieldable under forces transmitted thereto by expansion of the piston.

2. An internal combustion engine piston comprising a head having a relatively wide, circumferentially extending surface constituting a bearing for the piston against the cylinder wall, a skirt separated from the head and consisting of oppositely disposed, substantially rigid bearing walls united at their lower ends by short, flexible curved walls, and webs integral with the bearing wall and connected to the head and constituting the only connection between the skirt and head, the said webs having splits formed therein and flexible walls spanning the splits and yieldable under forces transmitted thereto by expansion of the piston.

3. A piston for an internal combustion engine comprising a head including an end disc and a peripheral flange, oppositely disposed webs depending from the said flange and disposed inwardly of the piston, bosses carried by the said webs, short, flexible, radial webs integral with and extending laterally from each of the said webs on either side of the bosses, a sectional skirt comprising oppositely disposed bearing walls each connected to the said resilient webs, and flexible, radial webs connecting the bearing walls together below the bosses.

4. A piston for an internal combustion engine comprising a head, oppositely disposed walls depending from the said head, bosses carried by the said depending walls, short, flexible, radial webs integral with and extending laterally from each of the said depending walls on either side of the bosses, a sectional skirt comprising oppositely disposed bearing walls each connected to certain of said flexing webs and spaced from the bosses, and flexible walls connecting the bearing walls together below the bosses.

5. In a piston provided with a skirt of aluminum alloy or like material having a relatively high co-efficient of expansion, a head, wrist pin bosses depending from the head, said skirt being relieved about said bosses and separated from their lower side, the portion of the skirt below the relieved part being slitted and culvert like members spanning said slits.

6. In an aluminum alloy piston the combination of a head and depending side walls grooved exteriorly for piston rings, wrist pin bosses connected to said head, a skirt connected to said bosses and relieved or cut away at the perimeter in the region of the bosses, the portion of the skirt below the bosses being spaced therefrom and slitted and having culvert like members spanning said slits.

7. In a piston for internal combustion engines or the like, the combination of a head and depending side walls therefor grooved exteriorly for piston rings, wrist pin bosses connected to the head and depending therefrom, a skirt provided with thrust face members disconnected from the head, means for connecting said skirt to the bosses, said skirt being relieved at the perimeter in the region of the bosses but extending circumferentially below the bosses, longitudinal slits in the portions of the skirt below the bosses and culvert like members spanning said slits mounted on the inner walls of the lower portion of the skirt and having their ends connected to the inside of the skirt on each side of the slits.

8. In a piston for internal combustion engines, the combination of a head and a skirt including thrust faces separated from each other, piston pin bosses in said skirt, webs connecting said thrust faces and bridging the openings between the thrust faces, slits in said webs and resilient culvert-shaped bridges spanning said slits and constituting the sole connection between the web parts.

In testimony whereof I hereunto affix my signature this 25th day of July, 1925.

FRANK JARDINE.